United States Patent
Sato (10) Patent No.: US 11,347,460 B2
(45) Date of Patent: May 31, 2022

(54) PRINTING SYSTEM AND NONTRANSITORY STORAGE MEDIUM STORING PROGRAM READABLE BY MOBILE TERMINAL

(71) Applicant: Brother Kogyo Kabushiki Kaisha, Nagoya (JP)

(72) Inventor: Hirokazu Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/148,669

(22) Filed: Jan. 14, 2021

(65) Prior Publication Data

US 2021/0232356 A1 Jul. 29, 2021

(30) Foreign Application Priority Data

Jan. 29, 2020 (JP) .............................. JP2020-012621

(51) Int. Cl.
*G06F 15/00* (2006.01)
*G06F 3/12* (2006.01)
*G06K 1/00* (2006.01)

(52) U.S. Cl.
CPC .......... *G06F 3/1296* (2013.01); *G06F 3/1236* (2013.01); *G06F 3/1292* (2013.01)

(58) Field of Classification Search
CPC ..... G06F 3/1296; G06F 3/1236; G06F 3/1292
USPC ............................... 358/1.1, 1.15, 1.13, 1.14
See application file for complete search history.

(56) References Cited

U.S. PATENT DOCUMENTS

| 2011/0109934 | A1* | 5/2011 | Lee ....................... G06F 3/1237 358/1.15 |
| 2012/0127519 | A1 | 5/2012 | Kikuchi |
| 2012/0314250 | A1* | 12/2012 | Ito ........................ H04N 1/0023 358/1.15 |
| 2013/0235422 | A1 | 9/2013 | Nakata |
| 2015/0002884 | A1* | 1/2015 | Okumura .............. G06F 3/1268 358/1.14 |
| 2016/0255220 | A1 | 9/2016 | Oguma et al. |

(Continued)

FOREIGN PATENT DOCUMENTS

| JP | 2011-008564 A | 1/2011 |
| JP | 2012-113384 A | 6/2012 |
| JP | 2013-186824 A | 9/2013 |

(Continued)

*Primary Examiner* — Douglas Q Tran
(74) *Attorney, Agent, or Firm* — Burr & Brown, PLLC (57) ABSTRACT

A printing system includes an information processing apparatus, a mobile terminal, and a printer. The information processing apparatus is configured to transmit job identification information and address information to the mobile terminal, and transmit a printing job to the printer when receiving a transmission request for the printing job identified by the job identification information from the printer. The mobile terminal is configured to transmit the job identification information and the address information to a selected execution printer. The printer is configured to transmit a transmission request for transmitting the printing job to the information processing apparatus specified by the received address information when receiving the job identification information and the address information from the mobile terminal, and execute printing processing in response to receiving the transmission request.

8 Claims, 10 Drawing Sheets

(56) References Cited

U.S. PATENT DOCUMENTS

2017/0048404 A1    2/2017   Miura
2019/0265929 A1*   8/2019   Kitagata ............... G06F 3/1287

FOREIGN PATENT DOCUMENTS

JP      2016-162134 A    9/2016
JP      2017-037451 A    2/2017

* cited by examiner

PRINTING SYSTEM AND NONTRANSITORY STORAGE MEDIUM STORING PROGRAM READABLE BY MOBILE TERMINAL

CROSS REFERENCE TO RELATED APPLICATION

The present application claims priority from Japanese Patent Application No. 2020-012621, which was filed on Jan. 29, 2020, the disclosure of which is herein incorporated by reference in its entirety.

BACKGROUND

The following disclosure relates to a technique of allowing a printer to print a printing job stored in an information processing apparatus.

There have been known a printing system in which a printing job stored in an information processing apparatus is transmitted to a printer in accordance with an operation on a printer side by a user, and the transmitted printing job is printed by the printer. Specifically, the printing job is transmitted from the information processing apparatus to the printer by the user operation of a user interface of the printer. The printer executes printing processing by using the received printing job.

SUMMARY

In such the printing system, an operation burden of the user may be high in user operation which is operated until the printing job stored in the information processing apparatus is transmitted to the printer.

Accordingly, an aspect of the disclosure relates to a printing system that reduces the operation burden of the user, and a non-transitory storage medium storing a program readable by a mobile terminal.

In one aspect of the disclosure, a printing system includes an information processing apparatus, a mobile terminal, and a printer. The information processing apparatus is configured to store a printing job and job identification information identifying the printing job so as to be associated with each other, transmit the job identification information and address information indicating an address of the information processing apparatus to the mobile terminal, and transmit the printing job to the printer when receiving a transmission request for the printing job identified by the job identification information from the printer. The mobile terminal is configured to receive the job identification information and the address information transmitted from the information processing apparatus receive a selection operation of an execution printer allowed to execute printing processing of the printing job, and transmit the job identification information and the address information to the selected execution printer. The printer is configured to transmit a transmission request for transmitting the printing job identified by the job identification information to the information processing apparatus specified by the received address information when receiving the job identification information and the address information from the mobile terminal, and execute the printing processing based on the printing job received from the information processing apparatus in response to receiving the transmission request.

In another aspect of the disclosure, a non-transitory storage medium stores a program readable by a computer of a mobile terminal capable of communicating with an information processing apparatus and a printer through a network. When the program is executed by the computer, the program allows the mobile terminal to receive job identification information identifying a printing job stored in the information processing apparatus and address information indicating an address of the information processing apparatus from the information processing apparatus, and receive a selection operation of an execution printer allowed to execute printing processing of the printing job, and transmit the job identification information and the address information to the selected execution printer.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

First Embodiment

A printing system according to an embodiment will be explained with reference to the drawings. It is to be understood that the following embodiment is described only by way of example, and the disclosure may be otherwise embodied with various modifications without departing from the scope and spirit of the disclosure.

Figure 1:
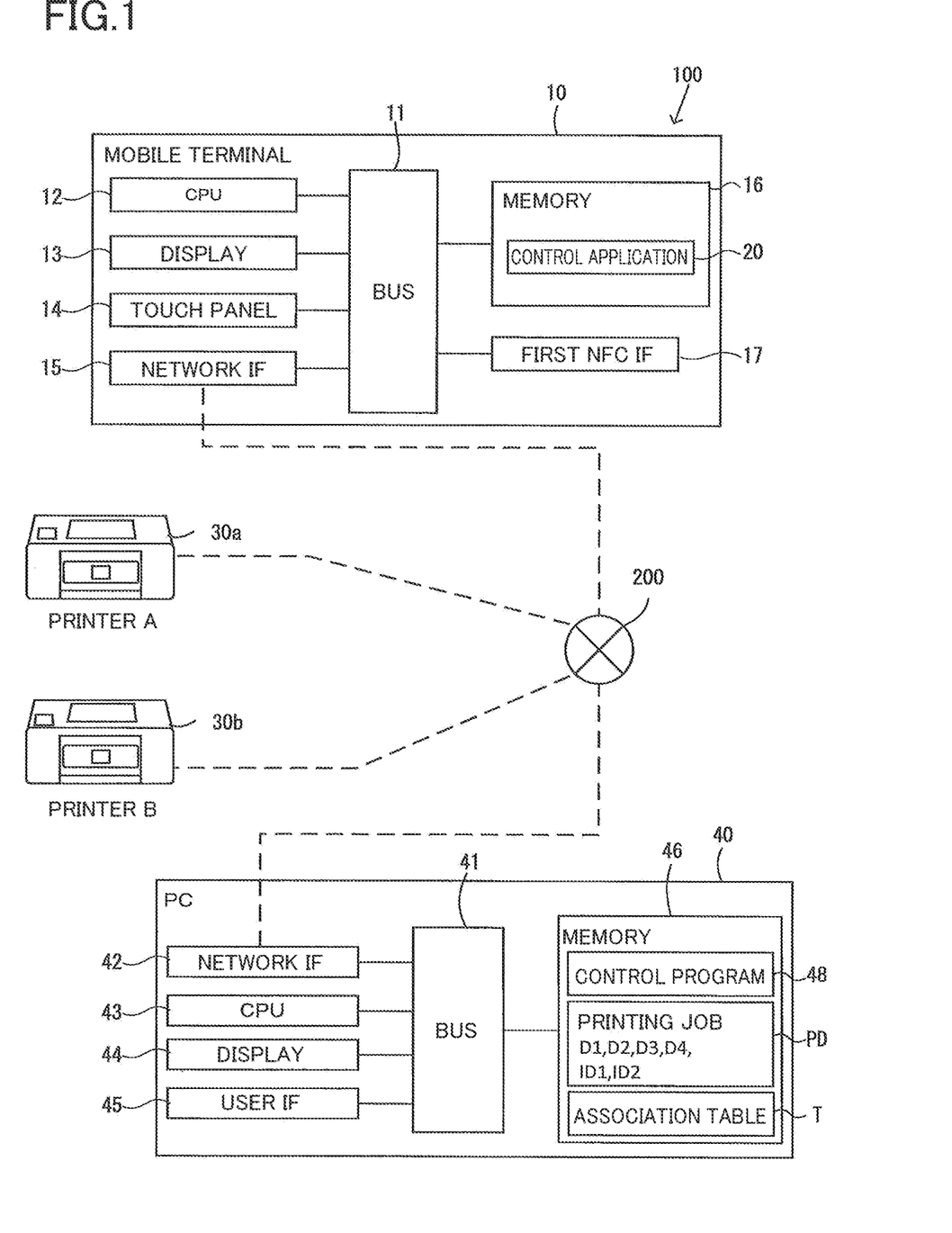
FIG. 1 is a configuration diagram of a printing system.

A printing system 100 illustrated in FIG. 1 includes a mobile terminal 10, printers 30*a*, 30*b*, and a PC (Personal Computer) 40. The mobile terminal 10, the printers 30*a*, 30*b*, and the PC 40 are connected to a network 200. The network 200 may be Internet, a local area network (LAN), or a combination of the LAN and Internet. The network 200 may be configured by a wired or wireless connection, or a combination of wired and wireless connections. Specifically, the PC 40 and the printers 30*a*, 30*b* are connected by wireless through a not-illustrated router configuring a part of the network. In the embodiment, the PC 40 is an example of an information processing apparatus.

The mobile terminal 10 is a smartphone or a tablet computer. The mobile terminal 10 includes a bus 11, a CPU (Central Processing Unit) 12, a display 13, a touch panel 14, a network IF 15, a memory 16, and a first NFC (Near Field Communication) IF 17. These components are configured to communicate with one another through the bus 11.

The display 13 has a display surface on which a screen is displayed. The touch panel 14 includes touch sensors and is disposed so as to cover the display surface of the display 13. The touch panel 14 functions as an operation unit, which detects approach/contact of a finger of a user or a touch pen to the touch panel 14 and outputs an electric signal in accordance with the detection. In the embodiment, the display 13 is an example of a display. The mobile terminal 10 may have operation keys which are physically provided as the operation unit.

The network IF 15 is capable of executing wireless communication, for example, in Wi-Fi (registered trademark) system based on a standard of IEEE 802.11 and standards corresponding to that. The network IF 15 may execute near-field wireless communication such as Bluetooth (registered trademark) with respect to the printers 30a, 30b.

The first NFC IF 17 is capable of executing wireless communication conforming to a standard of NFC with respect to a second NFC IF (described later) of the printers 30a, 30b. The first NFC IF 17 includes a not-illustrated antenna unit capable of transmitting/receiving a transmission wave. The first NFC IF 17 transmits data by being superimposed on a carrier wave from the antenna unit when transmitting data.

The memory 16 is configured by combining, for example, a RAM (Random Access Memory), a ROM (Read Only Memory), and a flash memory. The memory 16 may also be a storage medium readable by a computer. The storage medium readable by the computer includes recording media such as a CD-ROM and a DVD-ROM.

The memory 16 stores a control application (hereinafter called a control AP) in addition to a not-illustrated client-side OS (Operation System). A control AP 20 is a program provided by a vendor of the printers 30a, 30b, which can be downloaded from, for example a not-illustrated server on the network. The CPU 12 can execute the control AP 20 under execution of the client-side OS, thereby executing processing relating to pull print between the printers 30a, 30b and the PC 40. The pull print will be described later. Various data referred to by the CPU 12 at the time of executing the control AP 20 is stored in a data storage area of the memory 16. The control AP 20 is an example of a program in the embodiment. There may be a case where the CPU 12 executing the control AP 20 is merely written in the program name. For example, there may be a case where a description "the control AP 20" indicates "the CPU 12 executing the control AP 20".

In the embodiment, processing of the CPU 12 executed in accordance with commands written in the program is mainly described. That is, processing such as "determination", "extraction", "selection", "calculation", "decision", "identification", "obtainment (acquisition)", "reception" or "control" in the following description represents processing of the CPU 12. The processing by the CPU 12 also includes hardware control through the client-side OS. The "obtainment(acquisition)" is used as a concept in which request is not essential. That is, processing of receiving data without being requested by the CPU 12 is included in a concept that "the CPU 12 obtains data". Moreover, "data" in the specification is represented by a bit string readable by the computer. Then, data having substantially the same contents with a different format will be dealt with as the same data. The same applies to "information" in the specification.

Figure 2:
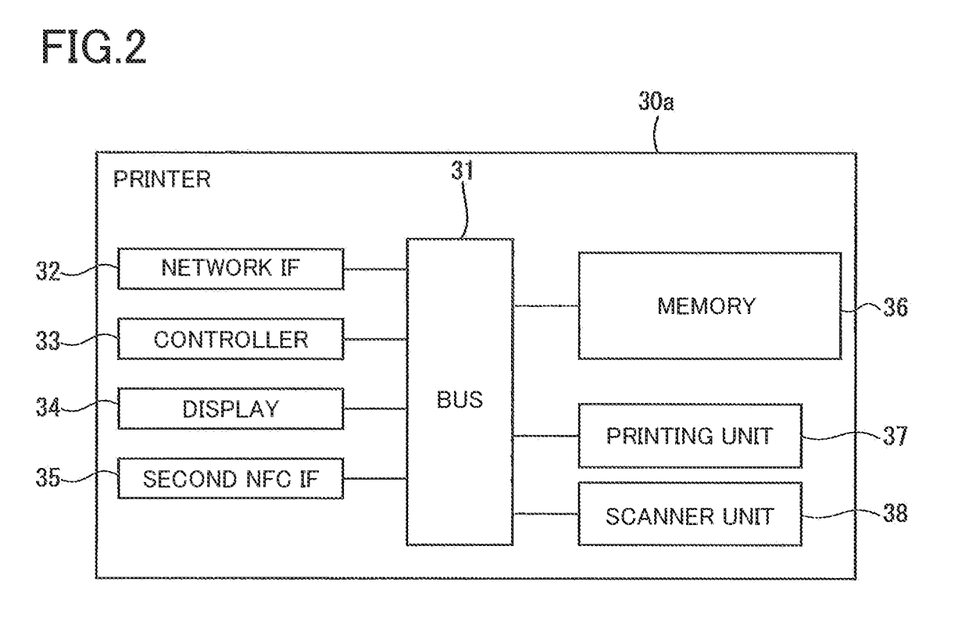
FIG. 2 is a configuration diagram of a printer.

The printers 30a, 30b are multifunction machines capable of executing printing processing and scanning processing. FIG. 2 is a configuration diagram of the printer 30a. As a configuration of the printer 30b is the same as that of the printer 30a, explanation thereof is omitted.

The printer 30a includes a network IF 32, a controller 33, a display 34, a second NFC IF 35, a memory 36, a printing unit 37, and a scanner unit 38. Respective components having reference number from 32 to 38 are connected through a bus 31.

The second NFC IF 35 is capable of executing wireless communication conforming the standard of NFC with respect to the first NFC IF 17 of the mobile terminal 10. The second NFC IF 35 has a not-illustrated antenna unit capable of transmitting/receiving a carrier wave. The second NFC IF 35 outputs data by extracting the data from the received carrier wave through the antenna unit when receiving data.

The printing unit 37 has a conveying mechanism configured to convey the paper, a printing head configured to discharge ink to the paper, and a carriage allowing the printing head to relatively reciprocate with respect to the paper. In the printing processing of the printer 30a, the ink is discharged while allowing the printing head to reciprocate with respect to the paper by the carriage, thereby printing an image. The scanning unit 38 is a mechanism of reading an original set on a not-illustrated platen or a feeder as digital data.

The controller 33 controls driving of the printing unit 37 in accordance with a printing job PD by executing the program stored in the memory 36 to thereby form a printing image on the paper. The controller 33 also executes the program stored in the memory 36 to thereby execute processing relating to the pull print described later.

A printer name of the printer 30a is called a "printer A" and a printer name of the printer 30b is called a "printer B" in the following description.

The PC 40 can communicate various data with the mobile terminal 10 and the printers 30a, 30b through the network 200. The PC 40 includes a bus 41, a network IF 42, a CPU 43, a display 44, a user IF 45, and a memory 46.

The memory 46 stores a control program 48 in addition to a not-illustrated server-side OS. The CPU 43 executes the control program 48 to thereby create the printing job PD from data created by a not-illustrated application or the like. The CPU 43 can further execute the processing relating to the pull print by executing the control program 48. The control program 48 is provided by the vendor of the printers 30a, 30b, for example, as an application, a printer driver, a software development kit and so on, which can be, for example, downloaded from a not-illustrated server on the network.

The printing job PD includes image information D1, print setting information D2, time information D3, and a thumbnail D4. The image information D1 is information illustrating an image to be printed by the printing job PD. The image information D1 is, for example, a bitmap image. The print setting information D2 is information indicating print setting (a paper size, color, the number of copies, yes/no of duplex printing and so on) at the time of executing printing processing of the printing job PD. The time information D3 is information indicating time when the printing job PD is created by the PC 40. The thumbnail D4 is an image obtained by reducing the size of the image to be printed by the printing job PD.

The printing job PD further includes a job identification information ID and a designated printer identification information ID2. The job identification information ID1 is information for uniquely identifying the printing job PD. The designated printer identification information ID2 is information identifying a designated printer as a printer whereby printing processing of the printing job PD is executed. In the embodiment, the designated printer identification information ID2 indicates a printer name. The memory 46 stores an association table T in which the job identification information ID1 is associated with an address of the memory 46 storing the printing job PD.

<Pull Print>

Next, the pull print which can be executed by the printing system 100 will be explained.

In the pull print, the user brings the first NFC IF 17 of the mobile terminal 10 in close to the second NFC IF 35 of any one of the printers 30a, 30b, thereby allowing the printer to which the mobile terminal 10 is brought in close to print the printing job PD created by the PC 40. The printer to which the mobile terminal 10 is brought in close is also called an "execution printer" in the following description. Specifically, a situation in which the printing job PD is stored in the memory 46 of the PC 40 is kept until the first NFC IF 17 of the mobile terminal 10 is brought in close to the second NFC IF 35 of any one of the printers 30a, 30b in the pull print. Then, when the first NFC IF 17 of the mobile terminal 10 is brought in close to the second NFC IF 35 of any one of the printers 30a, 30b, the printing job PD is transmitted from the PC 40 to the execution printer.

First, processing of pull print executed between the PC 40 and the mobile terminal 10 will be explained with reference to FIG. 3. In the embodiment illustrated in FIG. 3, connection of wireless communication is not established between the PC 40 and the mobile terminal 10.

At Step S10, pairing processing is executed between the PC 40 and the mobile terminal 10 for establishing connection of near-field wireless communication by Bluetooth. At Step S11, the PC 40 registers a port number in which the data transmitted from the mobile terminal 10 is received.

When the PC 40 receives an operation for instructing start of the control program from the user, the PC 40 starts the control program 48 at Step S12.

When the PC 40 receives, from the user, an operation of selecting the designated printer, an operation of selecting an image to be printed, an operation of designating print setting, and an instruction of executing the pull print, the PC 40 creates, based on the function of the control program 48, the printing job PD, the job identification information ID1, and the designated printer identification information ID2 at Step S13. The control program 48 creates the image information D1, the print setting information D2, the time information D3, the thumbnail D4, the job identification information ID1 and the designated printer identification information ID2 as the printing job PD. At Step S14, the PC 40 stores the printing job PD created at Step S13 into the memory 46. The control program 48 stores an address of the printing job PD in the association table T by associating the address with the job identification information ID1.

At Step S15, the control program 48 obtains an IP address Add on the PC 40 as an own machine. The IP address Add is information indicating a location of the PC 40 on the network 200.

On the other hand, when the CPU 12 of the mobile terminal 10 receives the operation of instructing the start of the control AP 20 from the user, the CPU 12 starts the control AP 20 at Step S20. The CPU 12 displays a function selection screen based on the function of the control AP 20 at Step S21. As illustrated in FIG. 4, a function selection screen 50 is a screen for allowing the user to select the function of the control AP 20, and the function selection screen 50 includes a selection icon display area 51 and a printer display area 52. In the printer display area 52, an icon 64 of the printer and a text 65 indicating the printer name are disposed. The printer name indicated by the text 65 is a printer name presently selected as the printer for executing printing processing on the mobile terminal 10. The text 65 indicates the "printer A" in FIG. 4. The printer name in the text 65 may be changed by a not-illustrated print setting screen.

In the selection icon display area 51, a print processing icon 60, a scan processing icon 61, and a pull print icon 62 are disposed. The print processing icon 60 is an icon configured to receive a selection operation by the user when allowing the printer 30a to execute printing processing. The scan processing icon 61 is an icon configured to receive a selection operation by the user when allowing the printer 30a to execute scanning processing. The pull print icon 62 is an icon configured to receive a selection operation by the user when allowing the printer to execute pull print. Note that the printer indicated in the text 65 is not always allowed to execute pull print in the embodiment. As described later, the pull print is executed by the printer corresponding to the designated printer identification information ID2 contained in the printing job PD.

A batch image 63 is disposed near the pull print icon 62 in the selection icon display area 51. The batch image 63 is an icon indicating the number of printing jobs PD which has not been printed by the printer at present. The number in the batch image 63 is set in accordance with the number of printing jobs PD already obtained from the PC 40 by the control AP 20 according to processing executed last time (processing of Step S16 in FIG. 3 described later) by the control AP 20.

Figure 3:
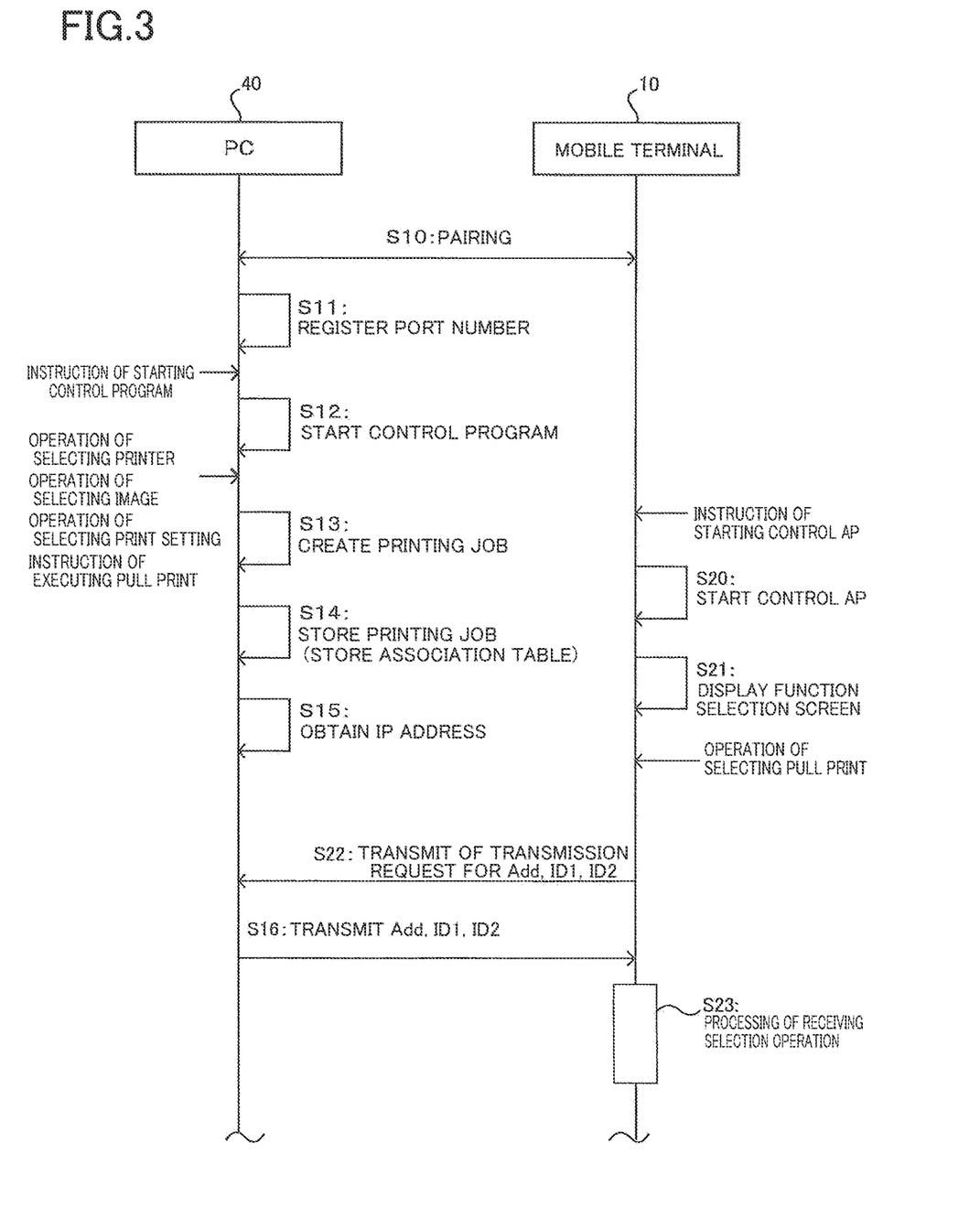
FIG. 3 is a timing chart for explaining processing executed between a PC and a mobile terminal.
Figure 4:
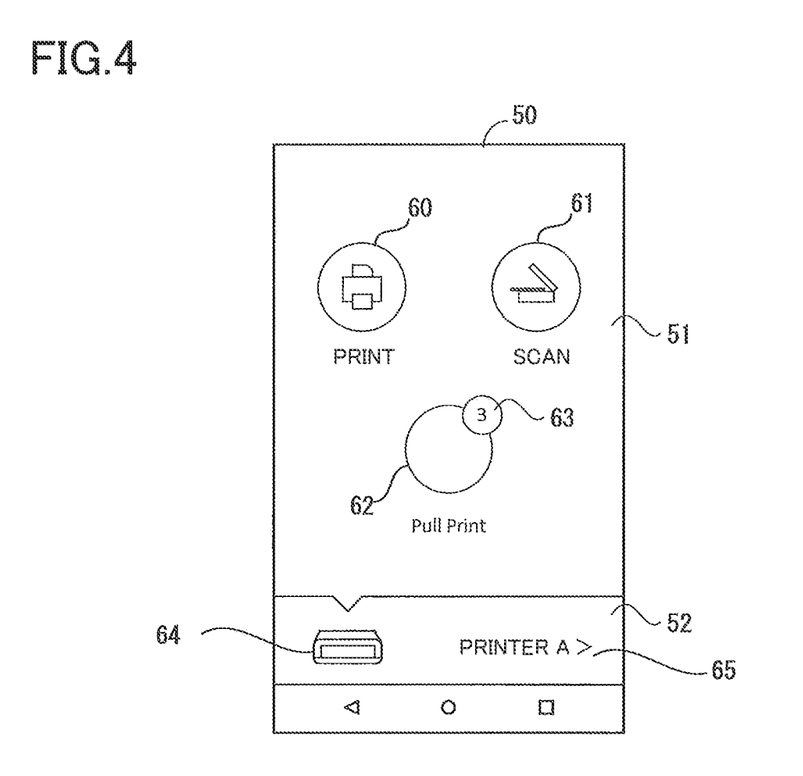
FIG. 4 is a view for explaining a function selection screen.

When the user executes the selection operation of the pull print icon 62 on the function selection screen 50, the control AP 20 transmits a transmission request for the IP address Add, the job identification information ID1, and the designated printer identification information ID2 to the PC 40 (Step S22 in FIG. 3).

When the PC 40 receives the transmission request for respective information from the mobile terminal 10 based on the function of the control program 48, the PC 40 transmits the IP address Add, the job identification information ID1, and the designated printer identification information ID2 at Step S16. In the embodiment, the control program 48 transmits the time information D3 and the thumbnail D4 included in the printing job PD to the mobile terminal 10 at Step S16. In accordance with the processing at Step S16, when the function selection screen 50 is displayed next time, the control AP 20 changes the number indicated by the batch image 63 so as to correspond to the job identification information ID1 newly received from the PC 40.

The control AP 20 executes selection operation receiving processing of receiving the selection operation of the printing job PD by the user at Step S23.

Figure 5:
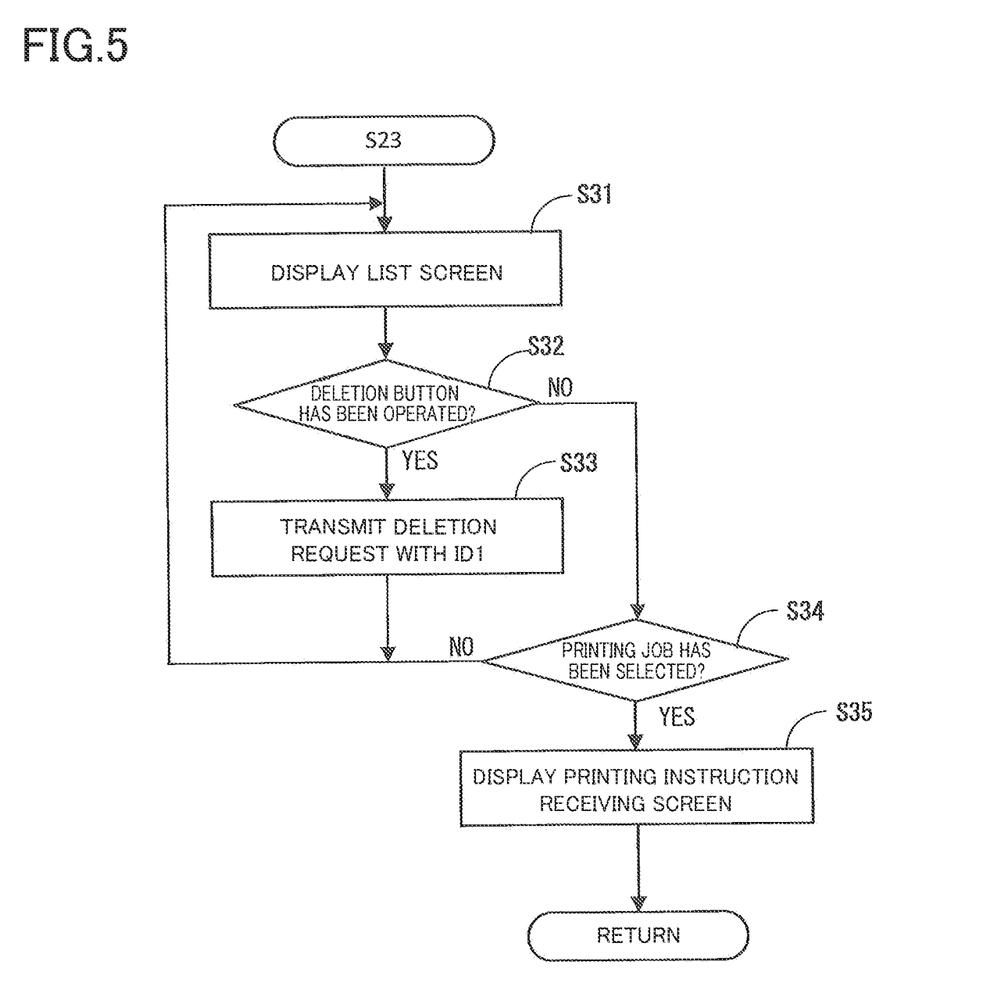
FIG. 5 is a flowchart for explaining processing executed at Step S23 of FIG. 3.

FIG. 5 is a flowchart for explaining a procedure of the selection operation receiving processing executed at Step S23 of FIG. 3. As a subject of respective processing illustrated in FIG. 5 is the control AP 20 (CPU 12), description of the subject is omitted.

Figure 6:
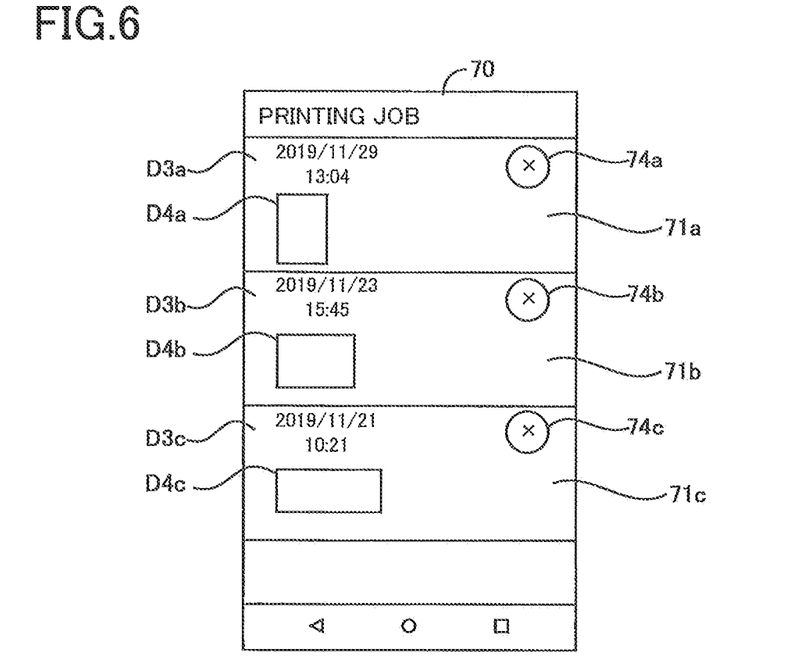
FIG. 6 is a view for explaining a list screen.

At Step S31, a list screen is displayed on the display 13. A list screen 70 illustrated in FIG. 6 is a screen on which printing jobs PD stored in the PC 40 are displayed in a list. The list screen 70 is configured so that a plurality of job display areas 71 each in which information relating to a corresponding one of the printing jobs PD (D3, D4) is displayed are arranged in a vertical direction in the embodiment. When distinguishing from each other among the job display areas 71 and distinguishing from each other among information displayed in the job display areas 71, alphabets (a, b, c) are added to ends of numerals. In the printing jobs PD displayed in the job display areas 71, a printing job PD with respect to a printer other than the printer indicated in the text 65 of FIG. 4 (for example, the printer B) may be displayed.

Each of the job display areas 71 (71a, 71b, 71c) included in the list screen 70 contains the time information D3 (D3a, D3b, D3c), the thumbnail D4 (D4a, D4b, D4c), and a delete button 74 (74a, 74b, 74c). Specifically, time information D3a, a thumbnail D4a and a delete button 74a are displayed in a job display area 71a. Time information D3b, a thumbnail D4b and a delete button 74b are displayed in a job display area 71b. Time information D3c, a thumbnail D4c and a delete button 74c are displayed in a job display area 71c. Note that, the printing job PD displayed in the job display area 71a is an example of a first printing job, and the printing job PD displayed in the job display area 71b is an example of a second printing job. The time information D3 and the thumbnail D4 are information transmitted from the PC 40 (Step S16 of FIG. 3). The delete button 74 is an icon configured to receive a selection operation by the user when the user deletes the printing job PD from a target of the pull print. When the selection operation of the delete button 74 is received, the job display area 71 containing the delete button 74 by which the selection operation is received is deleted from the list screen 70.

Returning to FIG. 5, it is determined whether the selection operation of the delete button 74 has been executed or not at Step S32. When it is determined that the selection operation of the delete button 74 has been received, the process proceeds to Step S33, at which a deletion request for the printing job PD receiving the deletion operation is transmitted to the PC 40. In the embodiment, the job identification information ID1 of the printing job PD to be a target of deletion is transmitted to the PC 40 with the deletion request. The PC 40 deletes the printing job PD corresponding to the job identification information ID1 from the memory 46 when receiving the deletion request from the mobile terminal 10.

When the processing at Step S33 is completed, the process returns to Step S31. In this case, the job display area 71 containing the printing job PD as the target of deletion is not displayed on the list screen 70. The control AP 20 may delete the job display area 71 containing the printing job PD as the target of deletion from the list screen 70 without transmitting the deletion request to the PC 40 at Step S33. In this case, the job display area 71 containing the printing job PD as the target area 71 is not displayed on the list screen 70 in the mobile terminal 10 operated by the user; therefore, the printing job PD as the target of deletion is excluded from the target of the pull print.

When it is determined that the selection operation of the deletion button 74 is not received at Step S32, the process proceeds to Step S34. At Step S34, it is determined whether the printing job PD to be the target of the pull print has been selected by the user or not. Specifically, when the selection operation of any of the job display areas 71 is executed on the list screen 70, the printing job PD corresponding to the job display area 71 in which the selection operation has been executed is selected as the target of the pull print.

In the case where the printing job PD to be the target of the pull print is not selected by the user, the process returns to Step S31. On the other hand, when the printing job PD to be the target of the pull print is selected by the user at Step S34, the process proceeds to Step S35, at which a printing instruction receiving screen is displayed on the display 13.

Figure 7:
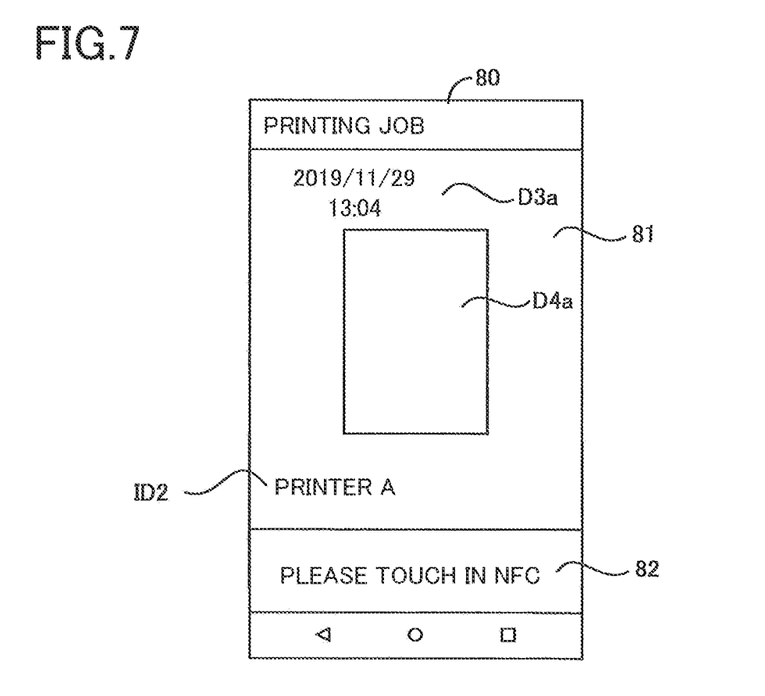
FIG. 7 is a view for explaining a printing instruction receiving screen.

A printing instruction receiving screen 80 illustrated in FIG. 7 is a screen for receiving an execution instruction of printing processing by the user. Specifically, FIG. 7 illustrates the screen displayed on the display 13 when a job display area 71a is selected on the list screen 70 of FIG. 6. The printing instruction receiving screen 80 includes a preview area 81 and an operation method display area 82.

In the preview area 81, the time information D3a, the thumbnail D4a, and the designated printer identification information ID2 are disposed. In the embodiment, the "printer A" is illustrated as the designated printer identification information ID2. The user can recognize the designated printer allowed to execute printing processing of the printing job PD by checking the preview area 81.

In the operation method display area 82, text for instructing an operation method of the mobile terminal 10 to the user is displayed. In the embodiment, text saying "please touch in NFC" is displayed in the operation method display area 82.

Figure 8:
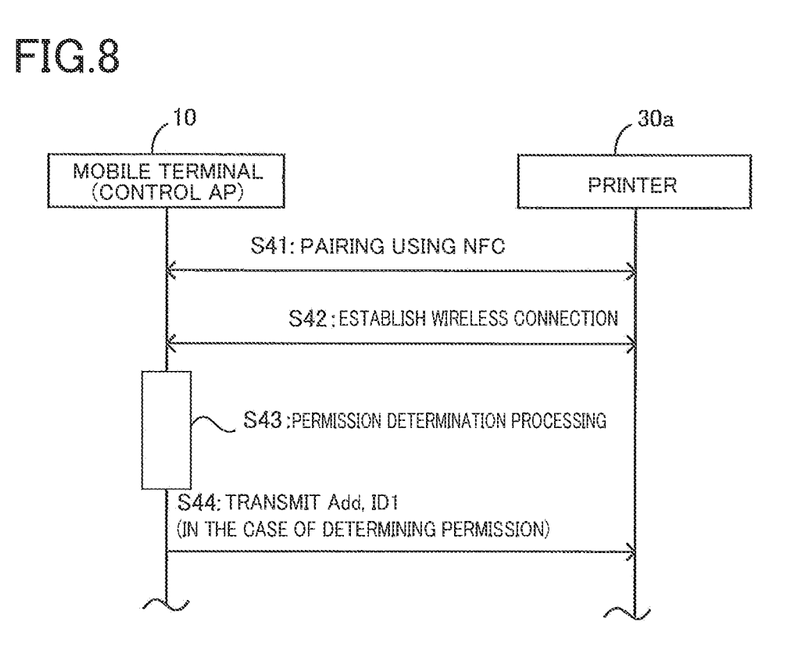
FIG. 8 is a timing chart for explaining processing executed between the mobile terminal and the printer.

Next, processing executed between the mobile terminal 10 and the printer 30a after the user brings the first NFC IF 17 of the mobile terminal 10 in close to the second NFC IF 35 of the printer 30a will be explained with reference to FIG. 8. That is, the operation of bringing the first NFC IF 17 of the mobile terminal 10 in close to the second NFC IF 35 of the printer 30a is an example of the selection operation of the printer (execution printer) allowed to execute the printing processing of the printing job PD.

At Step S41, pairing using the NFC is executed between the control AP 20 and the printer 30a. At Step S42, processing for establishing wireless connection by WiFi direct is executed between the control AP 20 and the printer 30b.

Figure 9:
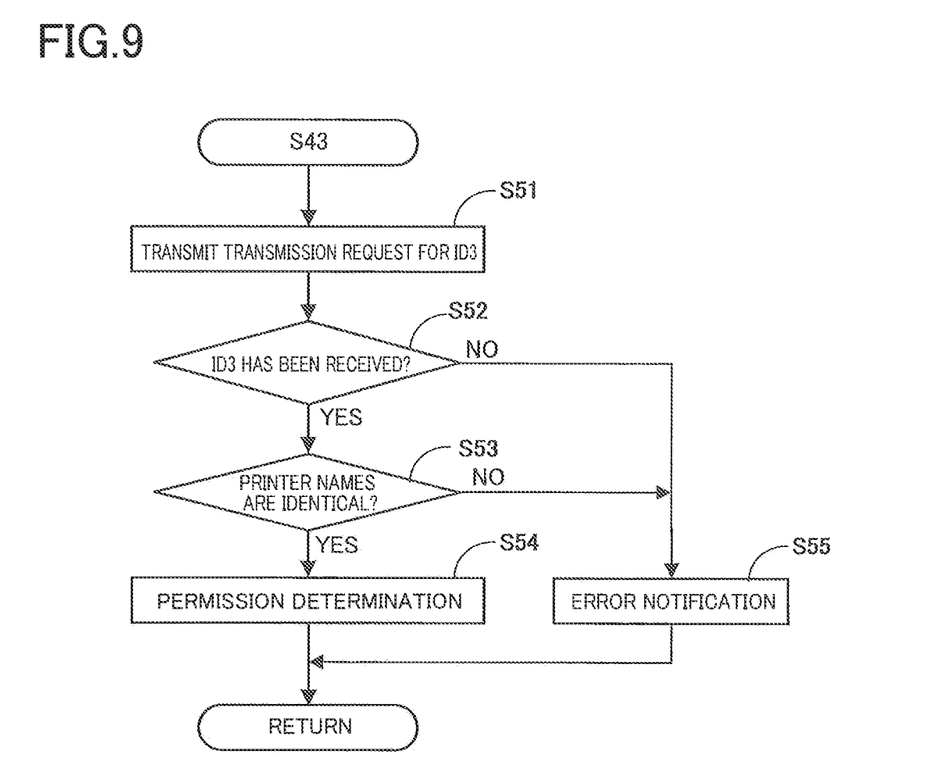
FIG. 9 is a flowchart for explaining processing executed at Step S43 of FIG. 8.

The control AP 20 executes permission determination processing at Step S43. The permission determination processing is processing for determining whether the control AP 20 permits the printer (execution printer) 30a to execute printing processing by the pull print or not. FIG. 9 is a flowchart for explaining the permission determination processing executed at Step S43.

At Step S51, a transmission request for execution printer identification information ID3 is transmitted to the printer 30a. The execution printer identification information ID3 is information for identifying the printer, and the execution printer identification information ID3 is information indicating a printer name in the embodiment. When the printer 30a receives the transmission request for the execution printer identification information ID3, the printer 30a transmits the execution printer identification information ID3 to the mobile terminal 10.

At Step S52, it is determined whether the execution printer identification information ID3 has been received or not. When it is determined that the execution printer identification information ID3 has been received, the process proceeds to Step S53. At Step S53, it is determined whether the printer name indicated by the designated printer identification information ID2 received from the PC 40 is identical with the printer name indicated by the execution printer identification information ID3 received from the printer 30a.

When Step S53 is affirmatively determined, namely, when the printer names indicated by identification information ID2, ID3 are identical with each other, the process proceeds to Step S54. At Step S54, permission determination for permitting the printer 30a (execution printer) to execute printing processing is executed. In this case, the job identification information ID1 and the IP address Add of the PC 40 are transmitted to the printer 30a at Step S44 of FIG. 8.

Accordingly, the printer 30*a* is permitted to execute printing processing relating to the pull print by the control AP 20.

On the other hand, when Step S52 of FIG. 9 is negatively determined, or when Step S53 is negatively determined, the printer names indicated by the identification information ID2, ID3 are not identical with each other; therefore, the process proceeds to Step S55. At Step S55, error notification is transmitted to the printer 30*a*. In this case, the printer 30*a* is not permitted to execute printing processing relating to the pull print by the control AP 20. When the printer 30*a* receives the error notification, the printer 30*a* displays, for example, text indicating the error on the display 34. When the error notification is transmitted, Step S44 of FIG. 8 is not executed.

Figure 10:
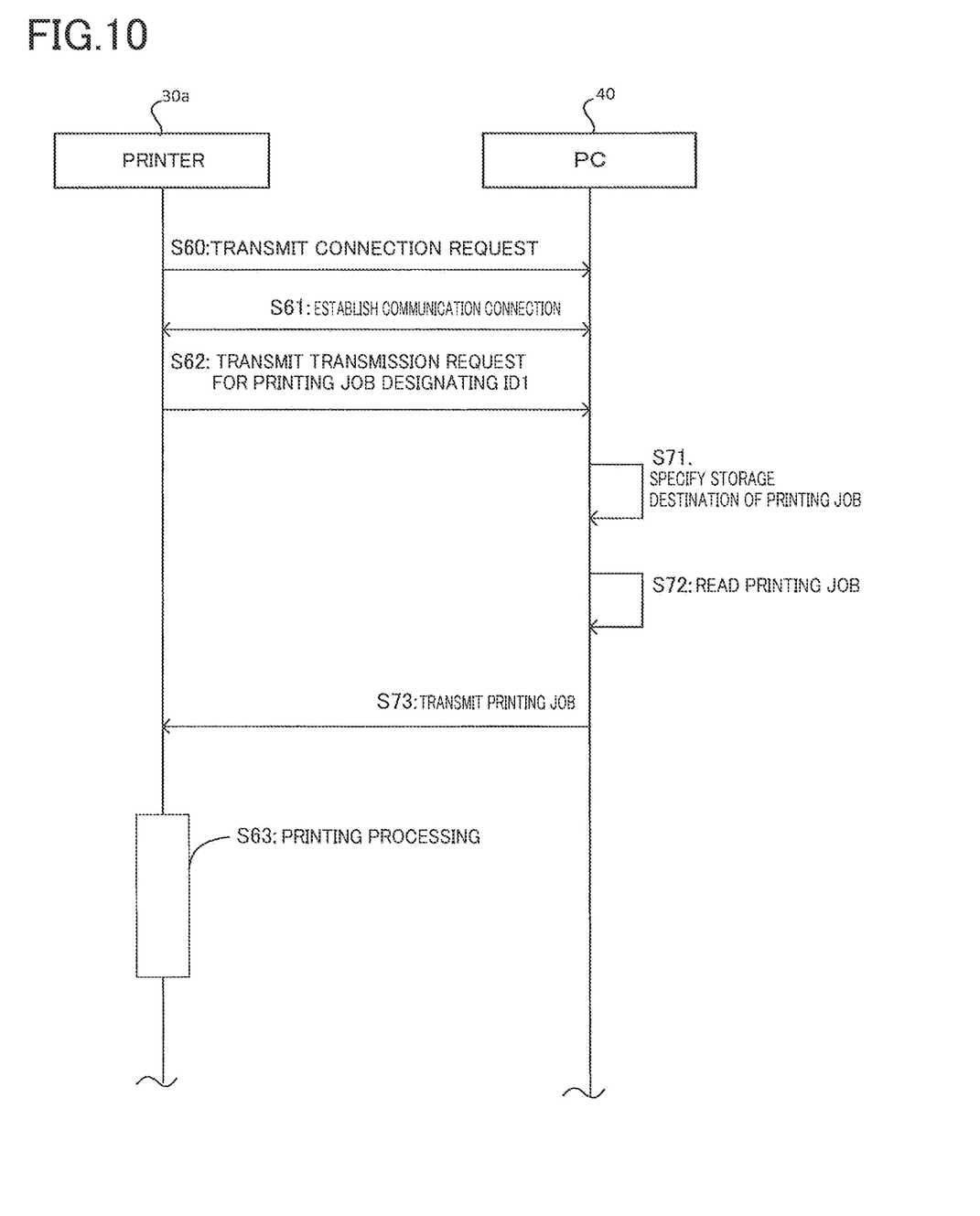
FIG. 10 is a timing chart for explaining processing executed between the printer and the PC.

Next, processing executed between the printer 30*a* and the PC 40 in the pull print will be explained with reference to FIG. 10. The processing illustrated in FIG. 10 is executed in response to receipt of the job identification information ID1 and the IP address Add by the printer 30*a* from the mobile terminal 10.

At Step S60, a connection request is transmitted to the PC 40 identified by the IP address Add received from the mobile terminal 10. Accordingly, communication connection is established between the printer 30*a* and the PC 40.

The printer 30*a* transmits a transmission request for the printing job PD designated by the job identification information ID to the PC 40 in which connection is established at Step S62.

When the PC 40 receives the transmission request for the printing job PD from the printer 30*a*, the PC 40 specifies, based on the function of the control program 48, a storage designation of the printing job PD by using the received job identification information ID1 at Step S71. As described above, the PC 40 stores, into the memory 46, the association table T in which the job identification information ID1 and the storage designation of the printing job PD are associated with each other on the memory 46, and the PC 40 specifies the storage designation of the printing job PD by referring to the association table T.

The control program 48 reads the printing job PD from the memory 46 at Step S72. The PC 40 transmits the printing job PD read at Step S72 to the printer 30*a* at Step S73.

When the printer 30*a* receives the printing job PD from the control program 48, the printer 30*a* executes printing processing using the received printing job PD at Step S63. That is, the printer 30*a* executes the printing processing relating to the pull print.

The embodiment explained above can produce the following effects.

The PC 40 transmits the job identification information ID1 for identifying the printing job PD and the IP address Add to the mobile terminal 10. The control AP 20 of the mobile terminal 10 receives the job identification information ID and the IP address Add from the PC 40. The control AP 20 receives the selection operation of the printer allowed to print the printing job PD, and transmits the job identification information ID1 and the IP address Add to the selected printer. When the printer receives the job identification information ID1 and the IP address Add from the mobile terminal 10, the printer transmits the transmission request for making the PC 40 specified by the received IP address Add transmit the printing job PD identified by the job identification information ID1. Then, the printer executes printing processing based on the printing job PD received from the PC 40 following the transmission request. Accordingly, the user can recognize the printing job PD to be printed by the printer while operating the mobile terminal 10; therefore, an operation burden of the user can be reduced.

The PC 40 stores the designated printer identification information for identifying the printer (designated printer) allowed to print the printing job PD into the memory 46 so that the designated printer identification information is associated with the printing job PD. The PC 40 transmits the designated printer identification information ID2 to the mobile terminal 10 operated by the user in addition to the job identification information ID1 and the IP address Add. The control AP 20 of the mobile terminal 10 obtains the execution printer identification information ID3 from the printer. When the printer name identified by the execution printer identification information ID3 is not identical with the printer name identified by the designated printer identification information ID2, the control AP 20 notifies that the printer identified by the execution printer identification information ID3 is not identical with the printer name identified by the designated printer identification information ID2. As the user who has created the printing job PD can designate the printer by the designated printer identification information ID2 in the above manner, it is possible to suppress that printing processing of the printing job PD is executed by an unintended printer.

The PC 40 transmits the designated printer identification information ID2 to the mobile terminal 10 with the job identification information ID and the IP address Add. The control AP 20 displays the name of the printer allowed to print the printing job PD identified by the job identification information ID on the printing instruction receiving screen 80 based on the job identification information ID1 and the designated printer identification information ID2. As the user can check the printer allowed to print the printing job PD while looking at the screen by the above display, the operation burden of the user at the time of allowing the printer to execute the printing processing can be further reduced.

When the control AP 20 receives the deletion operation from the user with respect to the printing job PD identified by the job identification information ID1, the control AP 20 transmits the deletion request for the printing job PD to be a deletion target to the PC 40 based on the job identification information ID1. When the PC 40 receives the deletion request with respect to the printing job PD from the mobile terminal 10, the PC 40 deletes the job identification information ID to be the target of the deletion request. Accordingly, the user can delete the printing job PD stored by the PC 40 by operating the mobile terminal 10.

The control AP 20 displays existence or nonexistence of the printing job PD in which printing processing has not been executed in printing jobs PD the job identification information ID1 of which have been received from the PC 40 on the display 13 as the batch image 63. Accordingly, the user can check the existence of the printing job PD in which printing processing has not been executed while looking at the batch image 63 displayed on the display 13 of the mobile terminal 10.

Modification Example of First Embodiment

Figure 11:
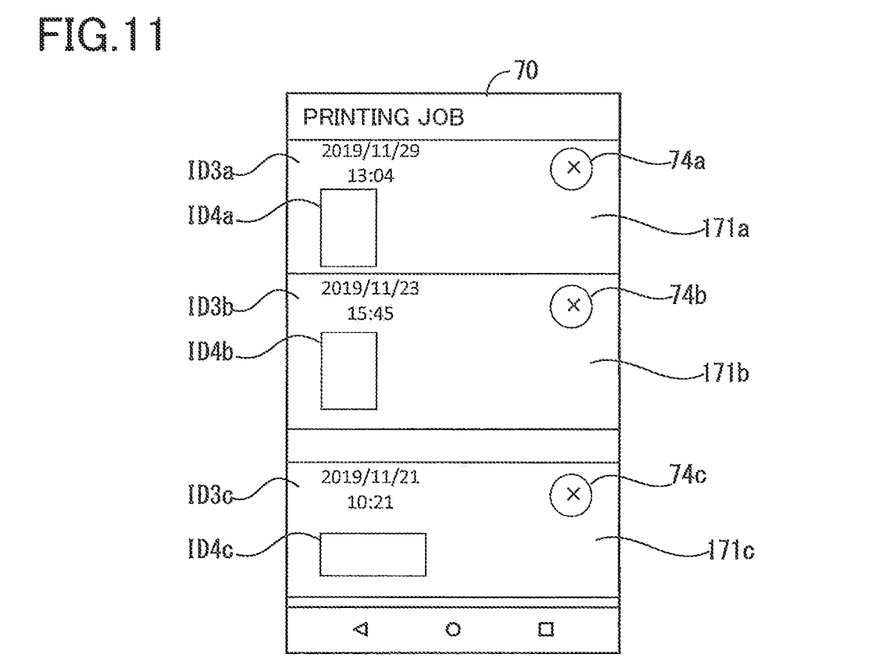
FIG. 11 is a view for explaining a list screen according to a modification example of a first embodiment.

In an arrangement state of respective job display areas on the list screen 70, the job display areas may be arranged in accordance with a corresponding designated printer. FIG. 11 is a view for explaining the list screen 70 according to an embodiment.

In the embodiment, the control AP 20 displays job display areas 171 corresponding to the printing jobs PD to be printed by designated printers such that the job display areas 171 are distinguished from each other by each of designated printers on the display 13. Specifically, job display areas 171*a*, 171*b* relate to printing jobs PD in which the printer 30*a* (an example of a first designated printer) is designated as the designated printer in a plurality of job display areas 171 contained in the list screen 70. A job display area 171*c* disposed next to the job display area 171*b* relates to the printing job in which the printer 30*b* (an example of a second designated printer) is designated as the designated printer. That is, the job display areas 171 corresponding to the same designated printer are successively arranged in a vertical direction in the embodiment. As illustrated in FIG. 11, time information ID3*a*, a thumbnail ID4*a* and the delete button 74*a* are displayed in the job display area 171*a*. Time information ID3*b*, a thumbnail ID4*b* and the delete button 74*b* are displayed in the job display area 171*b*. Time information ID3*c*, a thumbnail ID4*c* and the delete button 74*c* are displayed in the job display area 171*c*.

In this case, the control AP 20 may set the order of an arrangement of the job display areas 171 on the list screen 70 based on the designated printer identification information ID2 received from the PC 40 at Step S31 of FIG. 5. For example, the job display areas 171 may be arranged in descending order of the number of printer names designated by the designated printer identification information ID2 in the job display areas 171 displayed on the list screen 70.

In the embodiment, respective job display areas 171 may be arranged in a state in which corresponding designated printers can be recognized on the list screen 70. For that purpose, a background color of the job display areas 171 may be changed according to the designated printer.

In the embodiment explained above, the control AP 20 displays the printing jobs PD to be printed by the designated printers so as to be distinguished from each other on the list screen 70 by each of designated printers identified by the designated printer identification information ID2 on the display 13. Accordingly, the user can check correspondence relationship between printing jobs and printers while seeing the arrangement state of the list screen 70 displayed on the display 13 of the mobile terminal 10 even when a plurality of printing jobs PD exist.

Second Embodiment

In a second embodiment, configurations different from the first embodiment will be chiefly explained. In the second embodiment, the same reference signs are given to the same places as the first embodiment, and explanation thereof is not repeated.

In the embodiment, when the user brings the first NFC IF 17 of the mobile terminal 10 in close to the second NFC IF 35 of one of the printers 30*a*, 30*b*, printing jobs PD being executable by the one of the printers 30*a*, 30*b* (an example of a third printing job) and printing jobs PD being inexecutable by the one of the printers 30*a*, 30*b* (an example of a fourth printing job) are displayed so as to be distinguished from each other on the list screen 70. Specifically, the control AP 20 displays text saying "please touch in NFC" on the list screen 70 at Step S31 of FIG. 5. Then, when the user brings the first NFC IF 17 of the mobile terminal 10 in close to the second NFC IF 35 of any of the printers 30*a*, 30*b* in the state in which the list screen 70 is displayed, processing executed between the mobile terminal and the printer illustrated in FIG. 8 is executed. After the processing of Step S52 in the process of S43 (FIG. 9), the list screen 70 illustrated in FIG. 12 is displayed on the display 13 of the mobile terminal 10.

Figure 12:
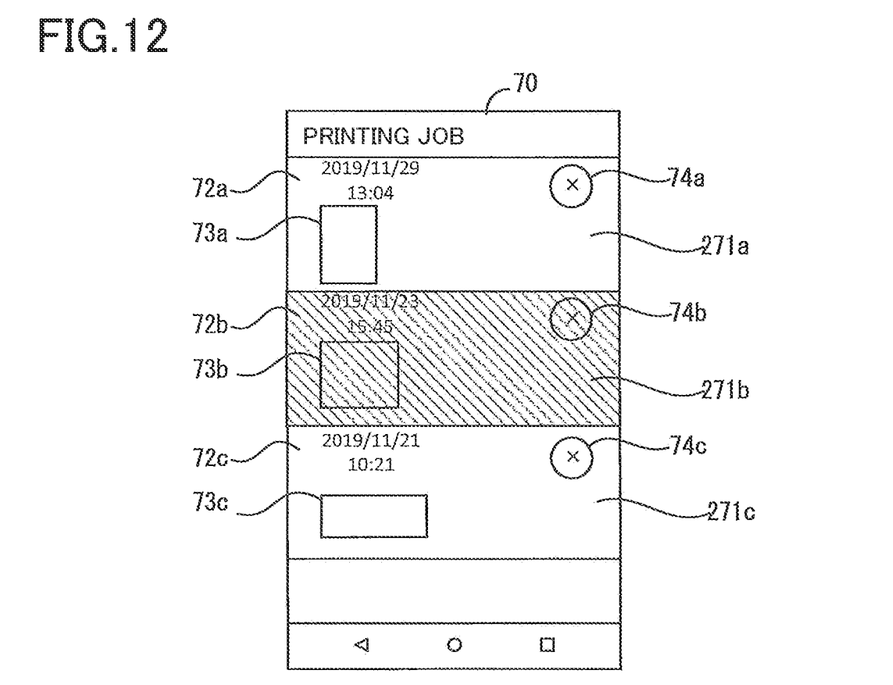
FIG. 12 is a view for explaining a list screen according to a second embodiment.

FIG. 12 illustrates the list screen 70 displayed as an example when the first NFC IF 17 of the mobile terminal 10 is brought in close to the second NFC IF 35 of the printer 30*a*. The list screen 70 of FIG. 12 contains three job display areas 271*a*, 271*b*, and 271*c*. Among them, the designated identification information ID2 designates the printer 30*a* in the printing jobs PD corresponding to the job display areas 271*a*, 271*c*. On the other hand, the designated printer identification information designates the printer 30*b* in the printing job PD corresponding to the job display area 271*b*. As illustrated in FIG. 12, time information 72*a*, a thumbnail 73*a* and the delete button 74*a* are displayed in the job display area 271*a*. Time information 72*b*, a thumbnail 73*b* and the delete button 74*b* are displayed in the job display area 271*b*. Time information 72*c*, a thumbnail 73*c* and the delete button 74*c* are displayed in the job display area 271*c*.

The background color of the job display area 271*b* illustrated with hatching is different from the background color of the job display areas 271*a*, 271*b* in FIG. 12, and the job display area 271*b* can be distinguished from the job display areas 271*a*, 271*c*. For example, the job display area 271*b* can be distinguished from the job display areas 271*a*, 271*c* by setting brightness of the back ground of the job display area 271*b* to be a color with a low brightness such as gray. That is, the printing jobs PD capable of being printed by the printer touched in NFC are displayed so as to be selectable, and the printing job PD incapable of being printed by the printer touched in NFC is displayed so as not to be selectable (gray out).

The control AP 20 displays the list screen 70 illustrated in FIG. 12 on the display 13 when receiving the execution printer identification information ID3 at Step S52 of FIG. 9. In this case, the control AP 20 may change the background color of the corresponding job display area 271, for example, with respect to the printing job PD corresponding to the designated printer identification information ID2 that is not identical with the execution printer identification information ID3. After that, when the user selects any of the printing jobs PD corresponding to the job display areas 271*a*, 271*c* displayed so as to be selectable in FIG. 12, processing after S53 is executed.

In the embodiment explained above, the control AP 20 displays respective job display areas 271 on the list screen 70 so that the printing jobs PD capable of being printed by the execution printer and the printing jobs PD incapable of being printed can be distinguished from each other on the display 13 based on the execution printer identification information ID3 obtained from the printer. Accordingly, the user can easily check the printing job PD which can be printed from now even when the job display areas 271 corresponding to a plurality of printing jobs PD are displayed on the list screen 70.

OTHER EMBODIMENTS

The technique disclosed in the specification is not limited to the above embodiments and may be modified in various manners in a scope not departing from the gist thereof, and for example, the following modifications may be included.

It is also preferable that the PC 40 does not have the function of creating printing jobs PD and stores printing jobs PD created by another PC into the memory 46.

The information processing apparatus is not limited to the PC but may be configured by a PC that creates printing jobs PD and a server storing the printing jobs PD created by the PC. In this case, the PC may store an IP address of the server as address information into the memory 46 and may transmit an IP address Add of the server to the mobile terminal 10.

The operation, by the user, for selecting the printer (namely, the execution printer) allowed to execute printing processing of the printing job PD is not limited to the operation of bringing the first NFC IF 17 of the mobile terminal 10 in close to the second NFC IF 35 of the printer. For example, the user may execute the selection operation of the printer allowed to execute printing process of the printing job PD on the screen displayed on the mobile terminal 10.

What is claimed is:

1. A printing system, comprising:
   an information processing apparatus;
   a mobile terminal; and
   a printer,
   wherein the information processing apparatus is configured to
      store a printing job and job identification information identifying the printing job so as to be associated with each other,
      transmit the job identification information and address information indicating an address of the information processing apparatus to the mobile terminal, and
      transmit the printing job to the printer when receiving a transmission request for the printing job identified by the job identification information from the printer,
   wherein the mobile terminal is configured to
      receive the job identification information and the address information transmitted from the information processing apparatus, and
      receive a selection operation of an execution printer allowed to execute printing processing of the printing job, and
      transmit the job identification information and the address information to the selected execution printer,
   wherein the printer is configured to
      transmit a transmission request for transmitting the printing job identified by the job identification information to the information processing apparatus specified by the received address information when receiving the job identification information and the address information from the mobile terminal, and
      execute the printing processing based on the printing job received from the information processing apparatus in response to receiving the transmission request,
   wherein the information processing apparatus is further configured to
      store designated printer identification information identifying a designated printer allowed to execute the printing processing of the printing job so as to be associated with the printing job, and
      transmit the designated printer identification information to the mobile terminal in addition to the job identification information and the address information, and
   wherein the mobile terminal is configured to
      obtain, from the execution printer, execution printer identification information identifying the execution printer, and
      when the execution printer identified by the execution printer identification information is not identical with the designated printer identified by the designated printer identification information, notify the execution printer is not identical with the designated printer.

2. A printing system, comprising:
   an information processing apparatus;
   a mobile terminal; and
   a printer,
   wherein the information processing apparatus is configured to
      store a printing job and job identification information identifying the printing job so as to be associated with each other,
      transmit the job identification information and address information indicating an address of the information processing apparatus to the mobile terminal, and
      transmit the printing job to the printer when receiving a transmission request for the printing job identified by the job identification information from the printer,
   wherein the mobile terminal is configured to
      receive the job identification information and the address information transmitted from the information processing apparatus,
      receive a selection operation of an execution printer allowed to execute printing processing of the printing job, and
      transmit the job identification information and the address information to the selected execution printer,
   wherein the printer is configured to
      transmit a transmission request for transmitting the printing job identified by the job identification information to the information processing apparatus specified by the received address information when receiving the job identification information and the address information from the mobile terminal, and
      execute the printing processing based on the printing job received from the information processing apparatus in response to receiving the transmission request,
   wherein the information processing apparatus is configured to
      store designated printer identification information identifying a designated printer allowed to execute the printing processing of the printing job so as to be associated with the printing job, and
      transmit the designated printer identification information to the mobile terminal in addition to the job identification information and the address information, and
   wherein the mobile terminal includes a display and is configured to display the designated printer allowed to print the printing job identified by the job identification information on the display based on the job identification information and the designated printer identification information transmitted from the information processing apparatus.

3. The printing system according to claim 2, wherein the mobile terminal is configured to:
   display, on the display, a list screen containing a plurality of printing jobs each as the printing job identified by the job identification information; and
   display a first printing job and a second printing job of the plurality of printing jobs so as to be distinguished from each other on the list screen, the first printing job and the second printing job being to be respectively printed by a first designated printer and a second designated printer each as the designated printer identified by the designated printer identification information.

4. The printing system according to claim 1, wherein the mobile terminal includes a display and is configured to:
- display a list screen containing a plurality of printing jobs each as the printing job identified by the job identification information on the display;
- obtain, from the execution printer, execution printer identification information identifying the execution printer; and
- display a third printing job and a fourth printing job of the plurality of printing jobs so as to be distinguished from each other on the list screen, the third printing job being a print job executable by the execution printer, the fourth printing job being a print job inexecutable by the execution printer.

5. The printing system according to claim 1, wherein the mobile terminal is configured to:
- receive a deletion operation with respect to the printing job identified by the received job identification information; and
- in response to receiving the deletion operation, transmit a deletion request for deleting the printing job specified by the deletion operation to the information processing apparatus, and wherein the information processing apparatus is configured to delete the printing job to be deleted in response to receiving the deletion request of the printing job from the mobile terminal.

6. The printing system according to claim 1, wherein the mobile terminal includes a display and is configured to display, on the display, existence or nonexistence of the printing job, the printing processing of which has not been executed, among at least one printing job each as the printing job identified by the received job identification information transmitted from the information processing apparatus.

7. A non-transitory storage medium storing a program readable by a computer of a mobile terminal capable of communicating with an information processing apparatus and a printer through a network,
wherein, when the program is executed by the computer, the program allows the mobile terminal to
- receive job identification information identifying a printing job stored in the information processing apparatus and address information indicating an address of the information processing apparatus from the information processing apparatus;
- receive a selection operation of an execution printer allowed to execute printing processing of the printing job;
- transmit the job identification information and the address information to the selected execution printer,
- receive, from the information processing apparatus, designated printer identification information identifying a designated printer allowed to execute the printing processing of the printing job so as to be associated with the printing job,
- obtain, from the execution printer, execution printer identification information identifying the execution printer, and
- when the execution printer identified by the execution printer identification information is not identical with the designated printer identified by the received designated printer identification information, notify the execution printer is not identical with the designated printer.

8. A non-transitory storage medium storing a program readable by a computer of a mobile terminal capable of communicating with an information processing apparatus and a printer through a network,
wherein, when the program is executed by the computer, the program allows the mobile terminal to
- receive job identification information identifying a printing job stored in the information processing apparatus and address information indicating an address of the information processing apparatus from the information processing apparatus,
- receive a selection operation of an execution printer allowed to execute printing processing of the printing job,
- transmit the job identification information and the address information to the selected execution printer,
- receive, from the information processing apparatus, designated printer identification information identifying a designated printer allowed to execute the printing processing of the printing job so as to be associated with the printing job, and
- display the designated printer allowed to print the printing job identified by the job identification information on a display of the mobile terminal based on the job identification information and the designated printer identification information transmittal from the information processing apparatus.

* * * * *

UNITED STATES PATENT AND TRADEMARK OFFICE
CERTIFICATE OF CORRECTION

| | | |
|---|---|---|
| PATENT NO. | : 11,347,460 B2 | Page 1 of 1 |
| APPLICATION NO. | : 17/148669 | |
| DATED | : May 31, 2022 | |
| INVENTOR(S) | : Hirokazu Sato | |

It is certified that error appears in the above-identified patent and that said Letters Patent is hereby corrected as shown below:

In the Claims

<u>Column 15, Line 46, Claim 7:</u>
Please correct: "from the information processing apparatus;"
To: -- from the information processing apparatus, --

<u>Column 16, Lines 2-3, Claim 7:</u>
Please correct: "allowed to execute printing processing of the printing job;"
To: -- allowed to execute printing processing of the printing job, --

Signed and Sealed this
Twenty-eighth Day of January, 2025

Coke Morgan Stewart
*Acting Director of the United States Patent and Trademark Office*